United States Patent [19]
Nolte et al.

[11] Patent Number: 5,283,490
[45] Date of Patent: Feb. 1, 1994

[54] VENTILATING APPARATUS FOR DYNAMOELECTRIC MACHINE WITH ANIMAL RESTRICTED VENTILATING OPENINGS

[75] Inventors: Duane R. Nolte; David L. Konkol, both of Wausau, Wis.

[73] Assignee: Marathon Electric Mfg. Corp., Wausau, Wis.

[21] Appl. No.: 2,137

[22] Filed: Jan. 11, 1993

[51] Int. Cl.$^5$ .............................................. H02K 5/00
[52] U.S. Cl. .................................. 310/89; 310/88
[58] Field of Search .................. 310/85, 88, 89, 52, 310/58

[56] References Cited

U.S. PATENT DOCUMENTS

| | | | |
|---|---|---|---|
| 1,961,387 | 6/1934 | Pfleger | 172/36 |
| 2,114,907 | 4/1938 | Oesterlein | 172/36 |
| 2,360,303 | 10/1944 | Ingalls | 172/36 |
| 2,500,971 | 3/1950 | Wieseman et al. | 171/252 |
| 2,545,855 | 3/1951 | Luenberger | 171/252 |
| 3,027,470 | 3/1962 | Atherton | 310/59 |
| 3,094,272 | 6/1963 | McClure | 230/171 |
| 3,207,934 | 9/1965 | Robinson et al. | 310/57 |
| 3,407,317 | 10/1968 | Honsinger | 310/58 |
| 3,449,605 | 6/1969 | Wilson | 310/58 |
| 3,463,949 | 8/1969 | Stone | 310/89 |
| 3,761,748 | 9/1973 | Baumann et al. | 310/58 |
| 3,932,070 | 1/1976 | Porter et al. | 417/423 |
| 4,072,872 | 2/1978 | Gleichman | 310/53 |
| 4,742,257 | 5/1988 | Carpenter | 310/58 |
| 5,081,384 | 1/1992 | Rausch | 310/63 |

FOREIGN PATENT DOCUMENTS 61-251449  11/1986  Japan ............................ 310/89

Primary Examiner—Steven L. Stephan
Assistant Examiner—Matthew Nguyen
Attorney, Agent, or Firm—Andrus, Sceales, Starke & Sawall

[57] ABSTRACT

A standard induction motor includes an outer bearing including first and second end brackets joined to the opposite end of a tubular main frame by through bolts. Each of the end brackets is a cup-shaped member with a circular outer wall and a flat outer radial wall. The first end bracket has four spaced air inlet openings in the circular wall with axial cross bars forming elongated air passageways. A separate rodent guard unit is secured to each ventilation opening and includes an outer plate abutting the exterior of the circular wall and having integral clip members engaging edges of the ventilation opening. Each plate has circumferentially elongated openings extending across the cross bars to form small rodent excluding passageways. The second end bracket has a L-shaped ventilation opening in the circular wall and the radial wall. An L-shaped rodent guard has axially spaced wires overlying the air outlet opening in the circular wall and radially spaced wires overlying the ventilation opening in the radial wall. The wires are connected to each other by circumferentially spaced L-shaped support wires. Two of the radial wires abut the radial wall to opposite ends of through bolt openings and are secured in place by the through bolts and spanning a washer.

13 Claims, 2 Drawing Sheets

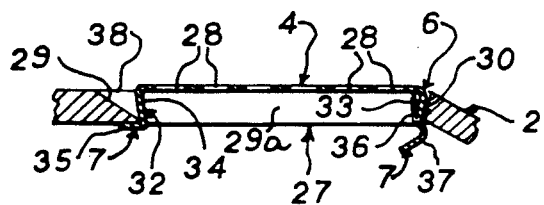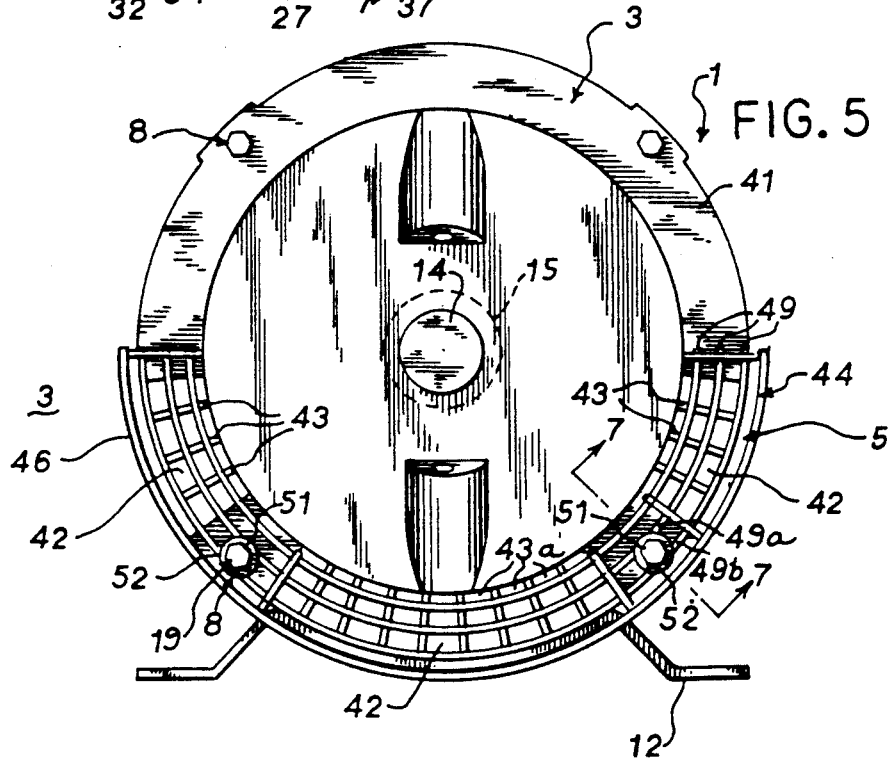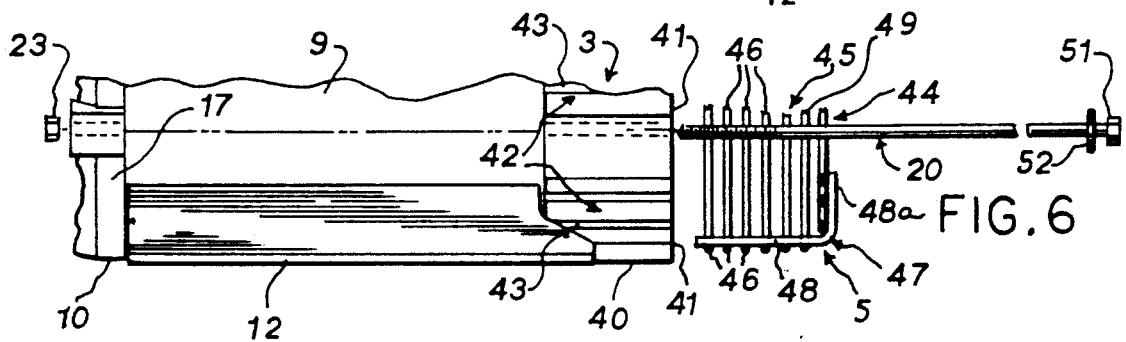

VENTILATING APPARATUS FOR DYNAMOELECTRIC MACHINE WITH ANIMAL RESTRICTED VENTILATING OPENINGS

BACKGROUND OF THE PRESENT INVENTION

This invention relates to a dynamoelectric machine having ventilating openings with foreign matter restrictive construction to selectively control the entrance of foreign matter and particularly animals.

Dynamoelectric machines including alternators and motors are conventionally constructed with a tubular main frame and end bells or brackets releasably secured to the opposite ends of the main frame. An annular stator unit is secured within the tubular main frame. A rotor is mounted within the stator unit, with shaft means projecting from the opposite ends and rotatably mounted in suitable bearings in the end brackets.

A fan unit is often incorporated into the rotor structure within one end bracket for generating of air flow through the motor. The end brackets are provided with appropriate openings to permit the air flow through the motor. The openings in the end bracket are advantageously formed with an integral grill work to maintain the strength of the end bracket while allowing appropriate volumes of air flow through the dynamoelectric machine.

In many applications, relatively significant openings are formed within the end brackets. In certain applications, special end bracket constructions are required to further restrict the size of the openings to minimize entry of small animals, including mice, snakes and like sized animals Motors for such applications may include a standard motor within which a special screen member is welded to the interior surface of the end bracket in overlying relationship to the air flow openings. Generally, a screen member is shaped to conform to the interior surface at the air openings and welded within the end bracket to overly the air openings. The motor end brackets can of course be specially constructed with appropriately sized openings. U.S. Pat. No. 5,081,384, which issued on Jan. 14, 1992, particularly discloses a ventilated motor having an end bracket within which a baffle and air deflector unit is integrally cast into the end bracket. The deflector openings are said to be of a sufficient size to prevent entrance of small animals, snakes and the like.

U.S. Pat. No. 2,500,971 which issued Mar. 21, 1950, illustrates a motor having large ventilating openings which are covered by screen units bolts over the openings by special bolts and bolt openings formed in the side wall of the frame which is extended downwardly to form a supporting base. This patent thus teaches and suggests a special motor structure providing special external mounting components for covering of the ventilating opening with a special separate screen through the use of totally separate mounting components.

In certain motors, the air flow openings are formed in the end face and the adjacent sidewalls as a plurality of closely spaced edge openings. In other motors, a single relatively large grilled opening is formed in the sidewall of one end frame. Generally, each manufacturer makes a line of standard motors with standardized ventilating openings.

Such prior art devices are well known in the art and have provided a satisfactory enclosure for the effective exclusion of small animals and the like. There is a need for a relatively simple and inexpensive system for modifying of a standard motor to the requirements of special applications which require animal-proof type enclosure and particularly such a motor system which is conveniently adapted to field application. Under such a system, distributors, sellers and users of motors may stock standard air-cooled motors and provide for special animal exclusion construction by modification of such motors.

There is a need for a simple, reliable and effective method for converting of a standard motor to a rodent guarded motor without requiring shop service and reworking.

SUMMARY OF THE PRESENT INVENTION

The present invention is particularly directed to construction of a standard motor with an air ventilating system in combination with an externally releasably mounted rodent guard unit for further limiting the size of ventilating openings whereby small animal and like foreign matter exclusion is provided. Generally, in accordance with the teaching of the present invention, a rodent guard unit is formed as an integrated element which can be directly coupled to the motor without the necessary disassembly of the motor or use of a special rodent guard structure built into the motor. The rodent guards of this invention provide a simple external installation that the customer may directly perform without the necessity of use of a motor service shop or highly skilled technician. Generally, in accordance with the teaching of the present invention, the standard dynamoelectric machine is constructed with integrally cast or otherwise formed ventilating openings in the end brackets of the dynamoelectric machines. The openings will normally be formed with grill-type construction including a plurality of spaced bar members to maintain the desired stability and strength of the end bracket while preventing accidental entrance or insertion of foreign elements into the motor under normal operation. Such standard motors, as almost universally constructed, however, will allow the entrance of small animals when in operation or prior to start up. In accordance with the present invention, a releasable outer rodent guard unit is provided which is releasably attached to the motor without the necessity of additional attachment elements provided on the motor bracket.

The rodent guard unit of this invention in a preferred construction is generally formed of a plurality of rigid and spaced members which extend across the bar members and thereby significantly reduce the size of the ventilating opening. It is specially shaped to conform to the outer face of the end bracket at the ventilating opening such that when applied it provides a complete overlying cover.

In one embodiment of the present invention, the overlying rodent guard unit is formed as a plate-like member having spaced openings and provided with a plurality of snap-in members which project from the principle plane of the member. The snap-in members are spaced in accordance with the location of the edges of the existing grilled openings and with the snap-in members resiliently engaging edges of the grill openings to firmly and reliably hold the rodent guard unit in position. In an alternate embodiment, the rodent guard unit is formed as an enlarged grill member slightly larger than the air-openings in the end bracket. The grill member is secured in tight abutting relationship to the exterior surface of the end bracket overlying the ventilating opening and the bracket surface adjacent the end bracket clamping through bolt openings. Generally, in accordance with this embodiment, it is merely necessary to remove the through bolts, insert an appropriate washer which will overlay the adjacent portions of the rodent guard unit, and reattach the through bolt to establish a rigid fixed support of the grill member to the end bracket. With the present invention, the exterior rodent guard unit is fabricated as a separate unit for each model of the standard motor.

The present invention thus provides a very simple, effective and reliable unit for modifying of a standard motor in the field without the necessity of any special additional attachment means which require any modification of the standard motor such as by welding or the like.

DESCRIPTION OF THE DRAWINGS

The drawings furnished herewith illustrate the best mode presently contemplated for carrying out the invention and are described hereinafter.

In the drawings:

FIG. 4 is a fragmentary vertical section taken generally on line 4—4 of FIG. 2 and more clearly illustrating the construction of a rodent guard unit shown in FIGS. 1-2;

FIG. 5 is an enlarged fragmentary elevational view of the back end of the motor incorporating a rodent guard unit;

FIG. 6 is a fragmentary exploded view of the rodent guard unit shown in FIG. 5 separated from the end bracket and motor; and FIG. 7 is a sectional view taken generally on line 7—7 of FIG. 5.

DESCRIPTION OF THE ILLUSTRATED EMBODIMENT

Figure 1:
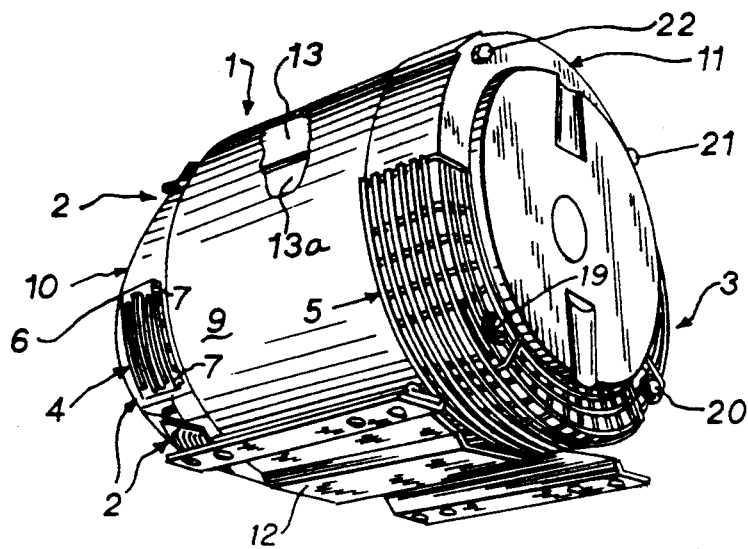
FIG. 1 is a pictorial view of an electric motor incorporating rodent guard units constructed in accordance with the present invention.
Figure 2:
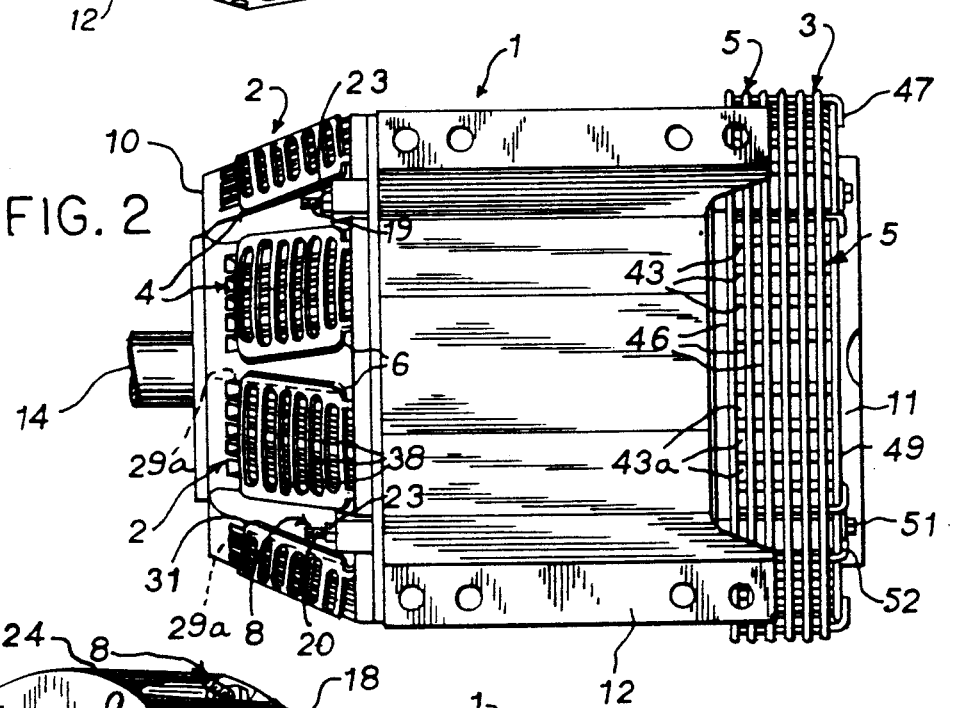
FIG. 2 is an enlarged bottom elevational view of the motor shown in FIG. 1.

Referring to the drawings and particularly to FIGS. 1 and 2, a standard ventilated motor 1 is illustrated having a ventilating structure 2 in a shaft end portion of the motor and ventilation structure 3 in the opposite shaft end of the motor. The ventilation structures 2 and 3 are constructed with ventilating openings in accordance with known technology applied in standard ventilated induction motors. The illustrated motor, as shown in the drawings, is modified to provide a rodent guarded motor by the incorporation of releasably attached rodent guard units 4 and 5 overlying the ventilation structures 2 and 3, respectively. In the illustrated embodiment of the invention, the shaft and ventilation structure 2 is partially closed by an apertured plate 6 having snap coupling elements 7 engaging the sidewalls of the ventilating structure 2. The opposite shaft end ventilation structure 3 is closed by a grill unit attached by the standard through bolts units 8 and thus releasably mounted in place with the standard pre-existing elements of a standard ventilated motor. Thus, both of the general units 4 and 5 are adapted for interconnection to the standardized motor without the necessity of service disassembly of the motor.

The illustrated induction motor is a typical standard construction including an outer tubular housing or main frame 9 with opposite end bells or brackets 10 and 11 secured in abutting relation to the opposite ends of the main frame. An optional support base 12 is shown welded or bolted to the bottom of the main frame 9. A stator 13 is secured within the main frame 9 with a rotor 13a rotatably mounted within the stator. A rotor shaft 14 is journaled in suitable bearings 15 located respectfully in the end brackets 10 and 11.

The end bracket 10 includes the shaft end ventilation structure 2 and is significantly axially deeper than the end bracket 11 which includes the opposite shaft end ventilation structure 3. A fan unit 16 is secured to the shaft 14 within the main frame 9 and creates air flow through the ventilation structure (2 or 3), over the motor windings and associated components and through the opposite ventilation (2 or 3) structure cooling the motor. The releasably mounted rodent guard units 4 and 5 are appropriately secured in location overlying the ventilating structures 2 and 3.

More particularly in the illustrated embodiment of the invention, the front end frame 10 has a circular end 17 abutting the end of the main frame 9 with interengaging radially offset flanges. The opposite shaft end bracket 11 includes a similar mounting end 18 with offset flanges engaging the opposite end 18 of the main frame 9. The end brackets 10 and 11 are secured in firm abutting engagement to the main frame 9 by the bolt units 8, shown as four suitable through bolts 19, 20, 21 and 22, in accordance with conventional practice. The bolts 19-22 are shown equicircumferentially spaced and passing through the end brackets and main frame, with a clamping nut 23 threaded onto the outer end of each through bolt. The through bolts 19-22 firmly interconnect the end brackets 10-11 to the main frame 9 and provide a complete working motor, with operation of the motor and affixed fan unit establishing air flow through the ventilating structures for cooling of the motor. The motor structure, as shown, is a typical standard ventilated induction motor. Where a rodent guarded motor is required, the rodent guard units 4 and 5 are releasably connected directly to the illustrated standard motor.

Referring particularly to FIGS. 1 through 4, the shaft end bracket 10 has a slightly tapered circular wall 24 extending outwardly and inwardly to an end plate 25 within which the shaft bearing unit is secured. The shaft end ventilation structure 2 is formed in the bottom of the circular wall 24, and shown as four circumferentially spaced ventilating openings 26 covering substantially the lower half of the end bracket wall 24. The openings 26 are generally rectangular in shape and of an identical size and construction, with two central openings 26 located in the bottom portion of the motor between the two through bolts 19 and 20. Outer openings 26 are located circumferentially outwardly of the adjacent through bolts 19 and 20.

Figure 3:
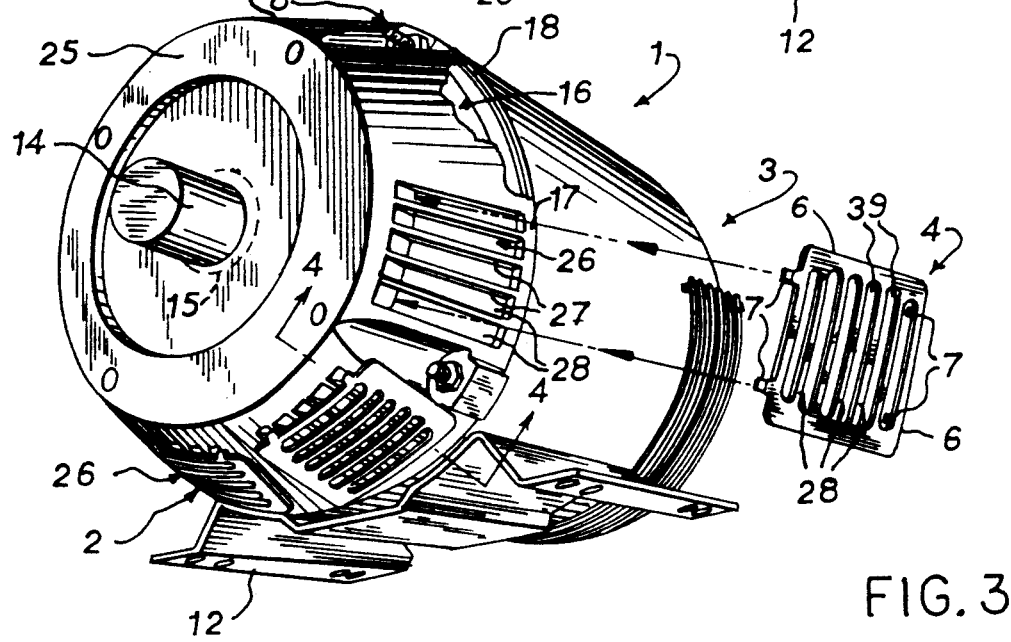
FIG. 3 is a separate fragmentary view of the releasably mounted rodent guard unit shown in FIG. 3.

Referring to the one opening 26, shown more clearly in FIGS. 2-4, a plurality of circumferentially spaced integral bridging bar members 27 span the opening 26 and define separate air passageways 28 to maintain a strong self-supporting end frame structure. The axial outer edge wall 29 of the opening 26 is formed with an inclined surface and the axially inner edge wall 30 is formed as a flat radial wall.

The rodent guard unit 4 is a stamped sheet metal plate member having the outer plate 6 overlying the opening 26. The stamped plate 6 member is formed with a cross sectional configuration complementing the outer wall 24 of the motor end bracket and thus is adapted to be secured in close abutting relationship to the bracket at the opening.

The depth of the plate 6 is slightly less than the opening with the axial front and rear edges and spaced from the front and rear edges of the opening 29 and 30 and passageways 28. The circumferential ends of plate 6 extend outwardly of the adjacent edges 29a of the ventilating opening 26, as at 31.

First coupling clips 32 are struck from the front edge of the plate 6 and project inwardly into securement to the front edge wall of the opening 26. Second coupling clips 33 project from the opposite rear edge of plate 6 and project inwardly into securement to the rear edge of the opening 26.

As shown most clearly in FIG. 4, the first clips 32 are formed as a part of simple L-shaped clips with an inwardly projecting leg 34 adjacent the front edge wall 29 and an outwardly projecting inner leg 35. The depth of the inwardly projecting legs 34 essentially correspond to the depth of the edge wall opening. With the clip in place, the inner legs 35 abut the inner surface of the opening edge wall 29. The opposite wall clips 33 have an inwardly projecting leg 36 with a first portion equal to the length of the ventilating opening edge wall 30 and an inner U-shaped end 37 extending axially from the leg 36 beneath the inner surface of the opening edge wall 30. The tapered construction of the end bracket results in the circumferential length of the opening at the outer edge wall 29 being slightly less than that of the inner edge wall 30. The clips 32 and 33 are located to fit within the edge passageways 28. In assembly of the guard unit 4 to the ventilating opening 26, the L-shaped clips 32 are inserted into the opening with the inner legs 35 extending inwardly beneath the opening edge wall 29. The opposite end of the plate is then pushed inwardly, with the U-shaped end 37 acting as a cam, deflecting the clips 33 inwardly and allowing the U-shaped end to move pass the opening edge wall 30 and then snapping inwardly into and beneath the opening edge wall.

The plate 6 includes a series of spaced arm members 38 which define openings 39 extending circumferentially of the openings 26. The openings 39 and passageways 28 are thus angularly related, shown as 90 degrees, and substantially reduce the individual openings or passageways through the end bracket 10

The end bracket 11 (FIGS. 5-7) is also a cup-shaped element having a circular wall 40 and a radial end wall or plate 41. The opposite shaft end ventilating structure 3 includes three extended ventilating openings 42 formed in the end bracket 11, and particularly walls 40 and 41. Each opening 42 is a single L-shaped opening in the connected portions of walls 40 and 41. Each opening 42 includes the plurality of integral L-shaped arm members 43 spaced within each opening to form a series of side-by-side passageways 43a. The L-shaped construction locates the legs 43 within the end wall 41 and the circular wall 40 of the end bracket 11. The rodent guard unit 5 is a welded wire grill assembly formed as a single integrated unit having a generally L-shaped construction with a radial end face portion 44 overlying the end plate or wall 41 of the end bracket 11 and an axial portion 45 extended axially over the circular wall 40 of the end bracket 11.

The openings 42 again spans the lower 180° of the motor end bracket 11. The central opening extends through slightly less than 90° between the two bottom through bolts 19 and 20. The two side openings 42 extend about 45° and are located circumferentially outwardly of the two through bolts 19 and 20.

The illustrated rodent guard unit 5 and particularly portion 45 includes a plurality of axially spaced rod-like members or wires 46 extending over the circular wall 40 to just slightly beyond the two outer air outlet openings 42, as shown in FIG. 5. Six similar wires 46 are shown equally and axially spaced. The wires are welded to a plurality of circumferentially spaced L-shaped support wires 47. Each support wire 47 has an axial leg 48 extended generally beneath the wires 46 and thus essentially throughout the axial length of the circular wall. In addition, each wire 47 has a short radial leg 48a which extends inwardly over the end plate of the end bracket 11 to a central offset portion. The radial leg 48 is spaced slightly from the end wall of the end bracket and a plurality of semicircular wires 49, shown as three, which are radially spaced and secured to leg 48 as by welding. The radius of the wires 49 vary slightly to maintain concentric location of the wires in radially spaced relation and in the overlying relationship to the opening 42 in the end plate 41. The welded wire assembly forms a strong integrated assembly.

The axially spaced welded wires extend across the openings 42 and the bars 43 and again reduces the size of the passageways 43a in the end bracket 11. The wires are spaced so as to locate two adjacent radial wires 49a and 49b directly to the circumferential opposite sides of the through bolt openings 50 for through bolts 19 and 20, and are engaged. The heads of the through bolts 19 and 20 to secure the rodent guard unit 5 in place and complete the rodent guarded motor. To insure very firm reliable clamping of the guard, small washers 52 are shown disposed between the head 51 of each through bolt 19 and 20 and the two adjacent wires 49a and 49b. The rodent guard unit 5 is thus secured in place using directly available through bolts which otherwise clamp the end brackets 10 and 11 and main frame 9 to each other, and thereby secure guard unit 5 in place without necessity of a special mounting structure such as in the prior art. Thus, where the air openings extend into the radial end plate of an end frame, the rodent guard is conveniently attached using the through bolts. However, the guard unit 5 could also be readily attached as individual rodent guard members with a snap-in type of a connection. Again, the significant factor is the interconnection of a rodent guard unit without the necessity of motor disassembly or special service operations while maintaining highly effective and reliable rodent protection.

In summary, each guard unit in accordance with present teaching is readily and directly provided by the motor user without the necessity for motor disassembly technical motor servicing or use of special guard mounting components.

Various modes of carrying out the invention are contemplated as being within the scope of the following claims particularly pointing out and distinctly claiming the subject matter which is regarded as the invention.

I claim:

1. A dynamoelectric machine comprising a cylindrical housing closed at the opposite ends by releasably mounted end brackets and including a stator structure and a rotor structure with the rotor structure supported by said end brackets, said end brackets being secured to said housing by circumferentially spaced through bolts extending through through-bolt openings in the end brackets, each end bracket having an exposed exterior wall and an interior wall, each of said first and second brackets including a ventilating structure allowing passage of fluid through the end brackets into and from said housing, said ventilating structure including at least one opening in one of said end brackets extending circumferentially about said machine and providing a standard operating dynamoelectric machine for use in selecting applications, a rodent guard unit adapted to be releasably secured in overlying and abutting relationship to said opening and to the exposed exterior wall of said one end bracket, said one end bracket having standard bracket components forming an operational element of said dynamoelectric machine and coupled directly to said rodent guard unit and forming the sole support for said rodent guard unit in overlying relationship to said opening without the use of any additional components and thereby reducing the size of the ventilating opening in said one end bracket to substantially prevent entrance of rodents.

2. The dynamoelectric machine of claim 1, wherein said exterior wall of said one end bracket includes a circumferential wall portion with said one opening in said wall portion and said rodent guard unit consists of an outer plate-like member configured to abut the circumferential wall portion of said end bracket in overlying relationship to said ventilating opening, said one opening having edges within said wall portion, said plate-like member having spaced openings and an interconnecting clip adapted to be projected into said ventilating opening immediately adjacent to an edge of said ventilating opening and said clip having a snap-in connection to said end bracket with said plate in overlying partial closure relationship to said ventilating opening and said spaced openings forming reduced passageways through said ventilating opening.

3. The machine of claim 2, wherein said ventilating structure in said one end bracket includes a plurality of spaced bar members defining passageways through said one opening, said plate-like member includes a plurality of closely spaced elongated openings extending substantially across said bar members of said ventilating opening and thereby creating said reduced passageways.

4. The dynamoelectric machine of claim 1, wherein said one bracket includes a radial wall and an axial wall, said one opening in said one end bracket includes a generally L-shaped edge ventilating opening extending circumferentially throughout the radial wall of said end bracket and the axial wall of said end bracket, said one opening being located adjacent at least one of said through bolts, said guard unit including a generally L-shaped cross section having an axial portion overlying and abutting the axial wall of said end bracket in overlying relationship to said one opening and having a radial wall of said end bracket and in overlying to said radial wall of said end bracket and in overlying relationship to said one opening, said guard unit having support members located immediately adjacent at least one of said through bolt openings and securely attached to said end bracket by said through bolt extending through said at least one through bolt openings.

5. The machine of claim 4, wherein said guard unit includes a plurality of spaced and intersecting wire-like members angularly located across said one opening and thereby establishing significantly reduced passageways between the exterior of said machine and the interior of said machine.

6. An electric induction motor comprising a housing including first and second spaced end bracket members abutting a center tubular section, a stator unit and rotor unit located within said center tubular section, said rotor unit including a supporting shaft extending outwardly through said end brackets, bearings in said end brackets for rotatably supporting of said shaft and interconnected rotor, a fan unit secured to said shaft within said tubular section adjacent said first end bracket, said end bracket being a cup-shaped member having a substantially circular wall extending outwardly as an extension from said center tubular section and having an outer radial wall integrally connected to said circular wall, said circular wall having an exterior wall surface, a plurality of air openings formed in said circular wall in close spaced relation and each opening having edge walls, each of said openings including a plurality of integrally formed circumferentially spaced wall members extending between opposite axially spaced edge walls of aid opening and forming axially elongated openings, a plurality of rodent guard units secured one each to each of said openings and each guard unit including an outer wall member abutting the exterior wall surface of said circular wall, each of said guard units including a plurality of inwardly projecting locking members located in abutting relation inwardly projecting locking members located in abutting relation to the edge walls of said openings and including at least one resilient member resiliently engaging and stressed by the engagement with one of said edge walls of said opening to resiliently and compressibly hold said guard unit to said end bracket, each said guard unit having a plurality of radially elongated spaced element overlying said openings to significantly reduce the size of said air openings and establish air passageways which significantly limit the entry of rodents and the like.

7. An air-cooled induction motor including a motor housing having an exterior wall with a stator and rotor located within said housing and having axially spaced ventilating openings in said exterior wall and having a stator and a rotor mounted with said housing providing a standard induction motor for use in selected applications, said housing having standard bracket components forming a functional element of said motor, the improvement in a conversion assembly for reducing the size of said ventilating openings, comprising separate rodent guard units adapted to be releasably secured abutting the exterior wall of said housing in overlying relationship to said ventilating openings, said standard bracket components being coupled directly to said rodent guard units and supporting said rodent guard units in overlying relationship to said ventilating openings without the use of any additional dedicated guard mounting components and thereby reducing the size of the ventilating openings for substantially preventing entrance of rodents.

8. The motor of claim 7, wherein said ventilating openings includes at least a first opening in one wall of said housing and having opening edges in said exterior wall, said rodent guard unit overlying said first opening including an outer plate-like member configured to abut the exterior wall of said housing in overlying relationship to said first opening, said plate having interconnecting clip members adapted to be projected into said first opening immediately adjacent to the edges of said first opening and forming a snap-in connection therewith to form the sole support of said guard unit in overlying partial closure relationship to said ventilating opening and forming reduced air passageways.

9. The motor of claim 8, wherein said first includes a plurality of axially elongated openings extending axially of said housing and said plate-like member includes a plurality of closely spaced elongated openings extending substantially across said axially elongated openings and thereby crating said reduces passageways.

10. The motor of claim 7, wherein said housing has a central tubular frame with said stator and rotor mounted therein and end brackets each having an axial circular wall and an outer radial wall, and said end brackets secured to said central tubular frame by through bolts, said ventilating openings including at least a first opening as a generally L-shaped edge opening in a first of said end brackets and providing for air movement into and from said central tubular frame and over said stator and rotor, said first opening extending circumferentially through the axial circular wall and said radial wall, said L-shaped opening being located adjacent at least one of said through bolts, said guard unit including a generally L-shaped member having an axial portion overlying and abutting said axial wall in overlying relationship to said first opening and having a radial portion extending inwardly in abutting relation to said radial wall in overlying relationship to said first opening, said guard unit having support members located immediately beneath at least one of said through bolts and securely attached to said housing by said through bolts.

11. The motor of claim 10, wherein said first ventilating opening includes a plurality of parallel bars defining passageways through said ventilating opening, said guard unit includes a plurality of spaced wire-like members extending at an angle across said parallel bars and thereby establishing significant reduced passageways into and from said tubular frame.

12. The motor of claim 10, wherein said ventilating openings include a second opening in a second of said end brackets and having opening edges in said second end bracket, said rodent guard unit overlying said second opening including an outer plate-like member configured to abut the wall of said end bracket in overlying relationship to said second opening, said plate-like member having interconnecting clip members adapted to be projected into said second opening immediately adjacent to the edges of said second opening and forming a snap-in connection therewith to form the sole support of said guard unit in overlying partial closure relationship to said second ventilating opening and forming reduced air passageways in said second opening.

13. The motor of claim 12, wherein said second ventilating opening includes a plurality of parallel bars defining passageways through said opening, said guard unit includes a plurality of spaced wire-like members extended at an angle across said parallel bars and thereby establishing said reduced air passageways.

* * * * *

UNITED STATES PATENT AND TRADEMARK OFFICE
CERTIFICATE OF CORRECTION

PATENT NO. : 5,283,490
DATED : February 1, 1994
INVENTOR(S) : DUANE R. NOLTE ET AL It is certified that error appears in the above-indentified patent and that said Letters Patent is hereby corrected as shown below:

Claim 1, col. 7, line 12, delete "selecting" and substitute therefor ---selected---; Claim 4, col. 7, line 58, after "radial" insert ---portion extending inwardly in abutting relation to said---; Claim 4, col. 7, lines 58-59, delete "to said radial wall of said end bracket and in overlying"; Claim 6, Col. 8, line 20, delete "aid" and substitute therefor ---said---; Claim 6, col. 8, lines 28-29, delete "inwardly projecting locking members in abutting relation"; Claim 9, col. 9, line 4, after "first" insert ---opening---; Claim 9, col. 9, line 10, delete "crating" and substitute therefor ---creating---; Claim 9, col. 9, line 10, delete "reduces" and substitute therefor ---reduced---.

Signed and Sealed this

Twenty-sixth Day of July, 1994

Attest:

BRUCE LEHMAN

Attesting Officer     Commissioner of Patents and Trademarks